OUTPUT BRANCH AMPLIFIER

Filed April 30, 1958

INVENTOR
ERICH BLOCH

BY

William V. Schelberg

AGENT

United States Patent Office 2,910,677

Patented Oct. 27, 1959

2,910,677

OUTPUT BRANCH AMPLIFIER

Erich Bloch, Poughkeepsie, N.Y., assignor to International Business Machines Corporation, New York, N.Y., a corporation of New York Application April 30, 1958, Serial No. 732,014

12 Claims. (Cl. 340—174)

This invention relates to switching circuits and more particularly to a magnetic core branching circuit which provides for transfer of information representing electrical impulses without attenuation.

The principles of the invention are demonstrated herein in connection with a basic all magnetic delay line, which is described and claimed in copending application Serial No. 528,594, filed October 16, 1955, in behalf of Louis A. Russell and which is assigned to the same assignee. This delay line provides for the transfer of binary information impulses by utilization of a storage magnetic core having a control winding thereon which acts both as an input and an output winding, an intercoupling transfer core, and a resistor. Circuit means are provided which serially connect the control winding with an input winding of the intercoupling transfer core and the output winding of the transfer core of a previous stage through the resistor. Resetting of transfer cores is done slowly so that the circulating current is small to prevent retrograde switching of the previous stage storage core, thus avoiding the necessity of the conventionally used diode intermediate such components.

The transfer of information, as disclosed in the copending application, for a full cycle of operation, is then directly dependent upon the reset time of the intercoupling transfer cores. Necessarily with a plurality of such stages connected in parallel with the output of the previous stage to provide output branching, a greater drive is needed for the previous stage. This, then, means a small resistance value which in turn necessitates a slower resetting of the transfer core decreasing the speed of operation. If, instead of one transfer core, there are provided a plurality of such cores having their input windings serially connected with the control windings on the stage storage core, the same lower resetting is required.

The present invention pertains to a novel switching arrangement that permits coupling with a plurality of output branches without decreasing speed of operation and, further, provides amplification of signal input.

Accordingly, it is a broad object of this invention to provide a new and improved branching circuit.

Another object of this invention is to provide a magnetic core branching circuit whereby signal attenuation is eliminated.

A further feature of this invention resides in the fact that the novel magnetic core circuit provided is additionally capable of performing the logical function or OR.

Other objects of the invention will be pointed out in the following description and claims are illustrated in the accompanying drawings, which disclose, by way of example, the principle of the invention and the best mode, which has been contemplated, of applying that principle.

A basic magnetic transfer circuit, similar to that disclosed in the aforementioned copending application, may be provided with the output winding of the intercoupling transfer core serially connected with a plurality of input windings of similar cores through a diode. With information read out of the storage magnetic core, the transfer core is switched and the circulating current in the output loop is blocked by the diode. The transfer core is immediately reset and driven so as to provide an output loop current large enough to switch each of the transfer cores in the output loop, thus providing output currents independent of the switching cores. A plurality of such circuits may be provided, having a common input winding in the output loop circuit. The signal produced when the common winding is energized is then indicative of the logical function OR.

Figure 1:
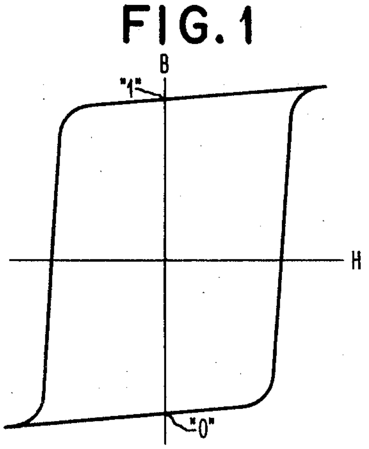
Fig. 1 is a representation of the hysteresis characteristic obtained for a magnetic material of the type employed.

Referring to Fig. 1, the curve illustrated represents a plot of flux density (B) versus applied field (H) for a magnetic core having a substantially rectangular hysteresis characteristic. The opposite remanence states are conventionally employed for representing binary information conditions and are arbitrarily designated as "0" and "1." With a "0" stored, a pulse applied to a winding linking the core in the proper sense causes the loop to be traversed and the remanence state "1" is obtained when the pulse terminates. Such a pulse is hereinafter referred to as a "write" pulse. Similarly, the core is read out or returned to the "0" state, in determining what information has been stored, by applying a pulse in reverse sense to the same or another winding. Such a pulse is hereinafter referred to as a "read" pulse. Should a "1" have been stored, a large flux change occurs with the shift from "1" to "0" conditions with a corresponding voltage magnitude developed on an output winding. On the other hand, should a "0" have been stored, little flux change occurs and negligible signal is developed on the output winding.

Figure 2:
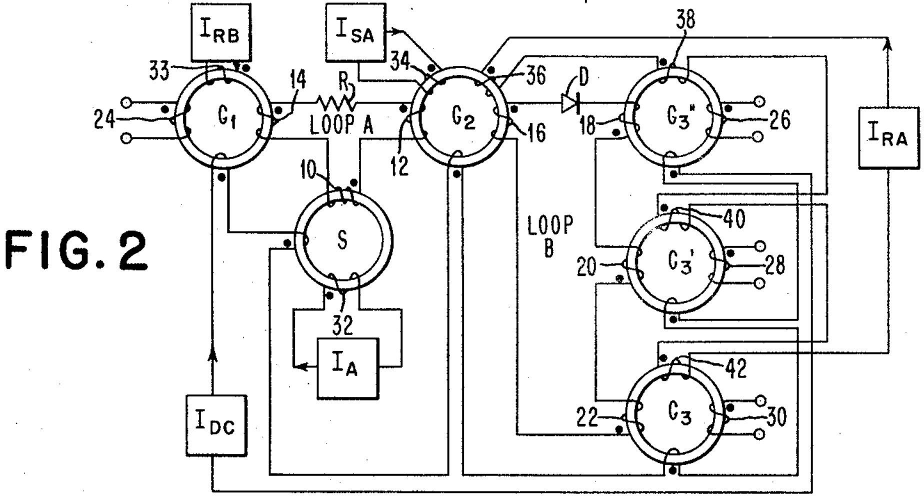
Fig. 2 is a circuit diagram of a magnetic core branching circuit in accordance with one embodiment of this invention.
Figure 3:
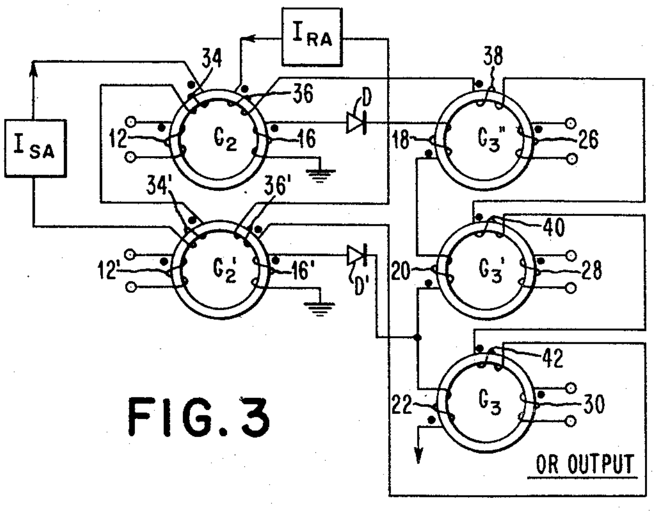
Fig. 3 is a circuit diagram of a magnetic core OR circuit in accordance with another embodiment of this invention.

A dot is shown adjacent one terminal of each of the windings indicating its winding direction in each of the Figs. 2 and 3. A write pulse is a positive pulse which is directed into the undotted end of the winding terminal which tends to store a "1" while a read pulse is a positive pulse directed into the dotted end of the terminal and tends to apply a negative magnetomotive force or to store a "0."

The arrangements disclosed employ input and output coupling magnetic cores arranged intermediate to so called storage magnetic cores which store certain logical information. These arrangements are adapted to be interconnected with each other and with similar types of circuitry through such coupling cores. The coupling cores may be fabricated of ferrite materials like the storage memory cores, however, it is not essential that these cores exhibit the rectangular hysteresis characteristic required for storage cores, but should have a good $Br/Bs$ ratio, as these devices function as variable impedance elements in controlling the transfer of information pulses as will be more evident from the following description. Such interconnecting coupling cores are illustrated in the circuit and are labeled $C_1$, $C_2$, $C_2'$, $C_3$, $C_3'$, and $C_3''$ for clarity. Also shown is the storage core S which is adapted to store information received and is adapted to deliver information to other similar type circuitry.

Referring now to Fig. 2, the core S is provided with a control winding 10 interconnected with an input winding 12 on the core $C_2$ and an output winding 14 on the core $C_1$ to a resistor R, which interconnection is hereinafter referred to as loop A. The core $C_2$ is further provided with an output winding 16 which is interconnected with an input winding 18 on the core $C_3''$ through a diode D, and a winding 20 on the core $C_3'$ and a winding 22 on the core $C_3$, which interconnection will hereinafter be referred to as loop B. An input is applied to the core $C_1$ by means of an input winding 24, while outputs are obtained from the branch by the means of an output winding 26 on the core $C_3''$, an output winding 28 on the core $C_3'$ and a further output winding 30 on the core $C_3$. The storage core S is energized from a clock pulse source $I_A$ and the coupling core $C_1$ is energized by a clock pulse source $I_{RB}$. The coupling core $C_2$ is energized from a clock pulse source $I_{SA}$ and the coupling cores $C_2$, $C_3$, $C_3'$ and $C_3''$ are each energized from a clock pulse source $I_{RA}$. A winding 32 is provided on the core S which is connected with the source $I_A$, a winding 33 is provided on the core $C_1$ connected with the source $I_{RB}$, and similarly, a winding 34 is provided on the core $C_2$ which is connected with the source $I_{SA}$. A further winding 36 is provided on the core $C_2$, a winding 38 on the core $C_3''$, and a winding 40 on the core $C_3'$ and a winding 42 on the core $C_3$ which windings are connected with the source $I_{RA}$.

The sequence of pulses provided by the several clock pulse sources described above is as indicated in the Fig. 4 which sources are adapted to operate wtih the circuit as shown in the Figs. 2 and 3.

Referring to the Fig. 2, assume all cores are in the lower remanence condition or in the "0" residual state as shown in the Fig. 1.

Figure 4:
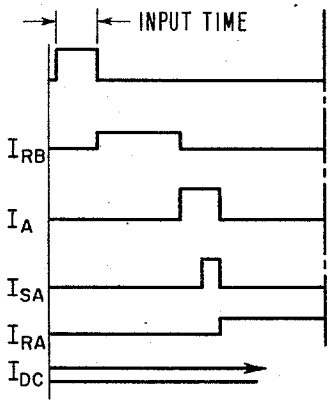
Fig. 4 illustrates the relative timing of current pulses which are required for the operation of the circuit shown in the Figures 2 and 3.

Assume an input signal, which appears at the time as indicated in the Fig. 4 and is directed into the undotted end of the winding 24 on the core $C_1$. The core $C_1$ is switched from the "0" to the "1" state and in so doing induces a voltage in the output winding 14 with its undotted end positive causing a counter-clockwise current in loop A. This current tends to write the core S and $C_2$, but, due to the greater number of turns in the winding 10 on the core S as compared with the number of turns in the winding 12 on the core $C_2$, the core S is preferentially switched from the "0" to the "1" state. The $I_{RB}$ clock pulse source then operates to direct a read signal into the winding 33 on the core $C_1$ which resets $C_1$ to the "0" state and in so doing induces a voltage in the winding 14 with its dotted end positive causing a clockwise current in loop A. This current in loop A tends to read the core $C_2$, already in the "0" state, and to read the core S, now in the "1" state. Resetting of the core $C_1$ is done slowly so the current in loop A at this time does not exceed read threshold for the core S. The core S is then left in the "1" state and all other cores are in the "0" state. Next, the $I_A$ clock pulse source directs a signal to the winding 32 on the core S which tends to read the core S and switch it from the "1" toward the "0" state causing a voltage to be induced in the control winding 10 with the dotted end positive. This induced voltage in the control winding 10 causes a counter-clockwise current in loop A which tends to write the core $C_2$ and read core $C_1$. Since the core $C_1$ is already in the "0" state, it offers low impedance to current flow and the core $C_2$ is switched from the "0" to the "1" state, inducing a voltage in the output winding 16 with the undotted end positive. The induced voltage in winding 16 tends to cause the counter-clockwise current in loop B which is blocked and its energy dissipated by the high back resistance of the diode D. Subsequent to the initial operation of the $I_A$ clock pulse source, but before its termination, the $I_{SA}$ clock pulse source directs a read signal into the winding 34 on the core $C_2$. The core $C_2$ is then reset from the "1" to the "0" state to induce a voltage in the windings 12 and 16 with their dotted end positive. The induced voltage in the winding 12 causes a counter-clockwise current in loop A which tends to read the core $C_1$ and write the core S. Since the core $C_1$ is already in the "0" state, it is uneffected, while the core S is held in the "0" state by virtue of the $I_A$ drive in the winding 32 which has not as yet terminated. The induced voltage in the winding 16 causes a clockwise current in loop B which tends to write each of the cores $C_3''$, $C_3'$, and $C_3$, respectively, and each of the cores $C_3$ are switched from the "0" to the "1" state to provide an output signal in the output windings 26, 28, and 30 on the cores, respectively. At the termination of the $I_A$ and $I_{SA}$ clock pulses, the $I_{RA}$ clock pulse source directs a read signal into the windings 36, 38, 40 and 42 on the cores $C_2$, $C_3''$, $C_3'$ and $C_3$, respectively, which resets the cores $C_3$, $C_3'$, and $C_3''$ from the "1" to the "0" state. The cores $C_3$, $C_3'$, and $C_3''$ in being reset induce a voltage in their windings 22, 20 and 18, respectively, with the dotted end positive, causing a counter-clockwise current in the loop B which tends to write the core $C_2$. Since the core $C_2$ is held in the "0" state by the $I_{RA}$ drive in the winding 36, it is uneffected, and all cores are returned to the "0" state, readying the circuit for the next cycle of operation. Thus, information has been transferred through a plurality of output branches without attenuation due to the external drive which resets the intermediate coupling core $C_2$ providing the greater ampere turn ratio necessary to switch the coupling cores $C_3$, $C_3'$ and $C_3''$ without increased shift control drive to the storage core S.

It is obvious that since each of the clock pulses, as applied to the windings linking the various cores are such as to switch the cores toward the "0" state, that if the storage core S, in the next cycle of operation, were left in the "0" remanence state, no information would be transferred and all cores would be left in the "0" state readying the circuit for the next cycle of operation.

Referring now to the Fig. 3, a plurality of output branches, two of which are shown, may be connected to provide a logical function of "OR." The coupling core $C_2$ is shown with the input winding 12 and the output winding 16 which is connected with the input winding 18 on the core $C_3''$, through the diode D, the input winding 20 on the core $C_3'$ and the input winding 22 on the core $C_3$. A similar coupling core $C_2'$ is shown with an input winding 12' and an output winding 16', which output winding is interconnected with the input winding 22 on the core $C_3$ through a diode D'. Outputs may again be provided by the windings 26 on the core $C_3''$, the winding 28 on the core $C_3'$, and the winding 30 on the core $C_3$. Inputs to the input windings 12 and 12' on the cores $C_2$ and $C_2'$, respectively, would then appear when the $I_A$ clock pulse source operates, as described above, or when the core S is read out. The cores $C_2$ and $C_2'$ are each energized from the clock pulse source $I_{SA}$, while the cores $C_2$, $C_2'$, $C_3$, $C_3'$ and $C_3''$ are each energized from the clock pulse source $I_{RA}$. A winding 34' is provided from the core $C_2'$ which was connected with the winding 34 on the core $C_2$ and the source $I_{SA}$, while a winding 36' is provided on the core $C_2'$ connected with the winding 36 on the core $C_2$, the winding 38 on the core $C_3$, the winding 44 on the core $C_3'$, and the winding 42 on the core $C_3''$, which are connected with the source $I_{RA}$.

It is seen fit to point out that each of the windings 12 and 12' on the cores $C_2$ and $C_2'$, respectively, are coupled with storage cores similar to the arrangement illustrated in the Fig. 2, and transfer of information which has been stored in such storage cores is as described above, with information, or signal input, directed into the input windings 12 and/or 12' when the storage core is read out upon operation of the $I_A$ clock pulse source.

Assume, upon operation of the $I_A$ clock pulse, information is to be transferred and a signal is directed into the undotted end of the winding 12 on the core $C_2$. The core $C_2$ is then switched from the "0" to the "1" state and in so doing induces a voltage in the output winding 16 with the undotted end positive, causing a current to be directed into the dotted end of the winding 22 on the core $C_3$ and which then tends to branch through the diode D′ and through the windings 20 and 18 in the cores $C_3'$ and $C_3''$, respectively, thence through the diode D. This current flow is blocked and its energy dissipated by the high resistance of the diodes D′ and D, respectively. Before termination of the $I_A$ clock pulse, the $I_{SA}$ clock pulse source operates to direct a read signal into the windings 34 and 34′ on the cores $C_2$ and $C_2'$, respectively, which resets the core $C_2$ from the "1" to the "0" state to induce a voltage in the windings 12 and 16 with their dotted ends positive. As described in the operation of the circuit of the Fig. 2, the induced voltage in the winding 12 causes a current which has no effect, while the voltage induced in the winding 16 causes a current which is directed through the diode D, the undotted ends of the windings 18, 20 and 22 and through the reverse direction of the diode D′. The high back resistance of the diode D′ dissipates the current, if any, directed through it and provides a high impedance path causing most of the current to flow through the winding 22 on the core $C_3$. Each of the cores $C_3$, $C_3'$ and $C_3''$ are switched from the "0" to the "1" state to induce an output voltage in each of the output windings 30, 28, and 26, respectively. Upon termination of the $I_A$ and $I_{SA}$ clock pulses, the $I_{RA}$ clock pulse source operates to direct a read signal into each of the windings 36, 36′, 38, 40 and 42 on the cores $C_2$, $C_2'$, $C_3''$, $C_3'$ and $C_3$, respectively, which resets the cores $C_3''$, $C_3'$ and $C_3$ from the "1" to the "0" state. The cores $C_3''$, $C_3'$ and $C_3$ in being reset induce a voltage in their windings 18, 20, and 22, respectively, with their dotted ends positive. The induced voltages are additive and cause a current flow into the undotted ends of the windings 16′ and 16 on the cores $C_2'$ and $C_2$, respectively and through the diodes D′ and D, respectively. This current is in such a direction as to write the cores $C_2$ and $C_2'$ but has no effect due to the $I_{RA}$ drive in the windings 36 and 36′, respectively, which holds the cores in the "0" state. Thus, when information is transferred through the transfer core $C_2$ and the output coupling cores $C_3$, $C_3'$ and $C_3''$, an output is obtained at the terminals of the windings 26, 28 and 30, respectively, of the output coupling cores.

When information is to be transferred via the transfer core $C_2'$, a signal is provided into the undotted end of the winding 12′ on the core $C_2'$ during the operation of the $I_A$ clock pulse similarly as described above for information transfer via the core $C_2$. Operation of the $I_{SA}$ clock pulse source accomplishes a resetting of the core $C_2'$ to induce a voltage in the winding 16′ which causes switching of the core $C_3$ from the "0" to the "1" state providing an induced voltage output in the winding 30, and resetting of the core $C_3$, from the "1" to the "0" state, is subsequently accomplished upon operation of the $I_{RA}$ clock pulse source. It is obvious that the current provided upon resetting of the core $C_2$ which switches the core $C_3$ to the "1" state is blocked in the upper branch by the diode D. Upon reset of the core $C_3$ by the $I_{RA}$ clock pulse, since all cores are read at this time by the $I_{RA}$ pulse applied to the windings linking each of the cores, the voltage induced in the winding 22 at this time has no effect.

When information is to be simultaneously transferred via the core $C_2$ and the core $C_2'$, the voltage induced in the windings 16 and 16′, respectively, as a result of the cores being switched from the "0" to the "1" state at $I_A$ time, i.e., the time of appearance of the $I_A$ clock pulse, causes a current flow which is blocked and its energy dissipated by the high back resistance of the diodes D and D′. Upon reset of the cores $C_2$ and $C_2'$ by operation of the $I_{SA}$ clock pulse source, a voltage is induced in each of the output windings 16 and 16′ with their dotted end positive to cause a current flow through the diode D and D′. This current switches the cores $C_3''$ and $C_3'$ as previously described, however, the core $C_3$ is switched at a faster rate since twice the amount of ampere turns necessary to cause switching is available. The output voltage induced in the winding 30 is then approximately twice the value the output voltages induced in either of the windings 28 or 26 and occurs in approximately one half the time increment. Upon operation of the clock pulse source $I_{RA}$, a read signal is directed into each of the windings 36, 36′, 38, 40 and 42 on the cores $C_2$, $C_2'$, $C_3''$ and $C_3$, respectively, which resets the cores $C_3''$, $C_3'$ and $C_3$ to the "0" state inducing a voltage in the windings 18, 20, and 22 causing a current flow which tends to write the cores $C_2'$ and $C_2$, but has no effect due to the $I_{RA}$ drive in the windings 36 and 36′ on the cores $C_2$ and $C_2'$, respectively. All the cores are thus left in the "0" state upon termination of the $I_{RA}$ clock pulse readying the circuit for the next cycle of information transfer.

It is perceived that to provide a given number of turns in the winding 22 on the core $C_3$ so that both the cores $C_2$ and $C_2'$ must be reset from the "1" to the "0" state in order to provide the necessary ampere turns to switch the core $C_3$ to the "1" state, the "And" function may be realized.

It may be pointed out that the storage, and coupling cores may be of square loop type magnetic material and in such instances a bias current may be provided to a further winding inductively associated with each of the cores individually, which biases the cores towards the positive threshold (in a write "1" direction) in speeding up the operation of the systems and such a winding is shown on each of the cores inductively associated therewith and connected with a source $I_{d.c.}$ In the interest of providing a complete disclosure, details of one embodiment of the branching device and the OR device wherein ferromagnetic cores are employed is given below, however, it is to be understood that other component values and current magnitudes may be employed with satisfactory operation obtained so that the values given should not be considered limiting.

With the clock pulse current $I_A$ and $I_{SA}$ delivering a constant current of 1.8 amperes, the winding 32 may comprise three turns and the winding 34 may comprise five turns and with the clock pulse current $I_{RA}$ delivering 1.35 amperes, the windings 36, 38, 40 and 42 may comprise two turns. In the coupling circuits, the windings 16 and 16′ may comprise twenty turns, the windings 14, 26, 24 and 30 may comprise twelve turns, the winding 10 may comprise ten turns, the windings 18, 20 and 22 may comprise five turns and the windings 12, 12′, and 24 may comprise four turns, with the resistor R of 6 ohms and the diodes D and D′ having the characteristics of the type T25 manufactured by the Transitron Company.

In this particular embodiment a bias current $I_{d.c.}$ of 0.5 amperes may be applied to a one turn winding on each core and each of the cores S and C may comprise toroids of magnesium-manganese ferrite composition having an outside diameter of 0.100 inch, inside diameter of 0.70 inch and thickness of 0.120 inch. This thickness may be obtained by stacking four cores each of 0.030 inch thickness and winding the stack as a single core unit.

While there have been shown and described and pointed out the fundamental novel features of the invention as applied to preferred embodiments, it will be understood that various omissions and substitutions and changes in the form and details of the devices illustrated and in their operation may be made by those skilled in the art without departing from the spirit of the invention. It is the intention therefore, to be limited only as indicated by the scope of the following claims.

What is claimed is:

1. An information transfer branching circuit comprising, a magnetic storage core; control winding means on said storage core; a first and a second transfer coupling core and a plurality of output coupling cores; input and output winding means on each of said coupling cores; circuit means connecting the output winding means on said first transfer core with the control winding means on said storage core and the input winding means on said second transfer core; further circuit means including an asymmetrical impedance device connecting the output winding means on said second transfer core with the input winding means on each of said output coupling cores; shift winding means on said first transfer core adapted to drive said first transfer core to a datum residual state when energized; shift winding means on said storage core adapted to drive said storage core to the datum residual state when energized; shift winding means on said second transfer core adapted to drive said second transfer core to the datum residual state when energized; and additional shift winding means on said second transfer core and on each of said output coupling cores adapted to be energized simultaneously to drive said second transfer core and each of said output coupling cores to the datum residual state.

2. An information transfer branching circuit comprising, a storage magnetic core formed of material having a substantially rectangular hysteresis characteristic with a switching threshold; control winding means on said storage core; a first and a second transfer coupling core and a plurality of output coupling cores; input and output winding means on each of said coupling cores; circuit means connecting the output winding means on said first transfer core with the control winding means on said storage core and the input winding means on said second transfer core; further circuit means including an asymmetrical impedance device serially connecting the output winding means on said second transfer core with the input winding means on each of said output coupling cores; shift winding means on said first transfer core adapted to be energized by a first clock pulse source and to drive said first transfer core to a datum residual state; shift winding means on said storage core adapted to be energized by a second clock pulse source and to drive said storage core to the datum residual state; shift winding means on said second transfer core connected with a third clock pulse source adapted to drive said second transfer core to the datum residual state when energized; and additional shift winding means on said second transfer core connected with shift winding means on each of said output coupling cores and a fourth clock pulse source adapted to drive said second transfer core and each of said output coupling cores to the datum residual state when energized.

3. A device as set forth in claim 2 including means for biasing said cores toward an opposite residual state.

4. A magnetic information transfer circuit with output branching comprising in combination, a magnetic storage core; control winding means on said storage core; a first, a second, a third, a fourth and a fifth magnetic coupling core; input and output winding means on each of said coupling cores; circuit means connecting the output winding means on said first coupling core with the control winding means on said storage core and the input winding means on said second coupling core; further circuit means including an asymmetrical impedance device connecting the output winding means on said second coupling core with the input winding means on each of said third, fourth and fifth coupling cores; shift winding means on said first coupling core connected with a first clock pulse source adapted to cause said first coupling core to shift to a datum residual state when energized; shift winding means on said storage core connected with a second clock pulse source adapted to cause said storage core to shift to the datum residual state when energized; shift winding means on said second coupling core connected with a third clock pulse source adapted to cause said second coupling core to shift to the datum residual state when energized; and shift winding means on each of said second, third, fourth and fifth coupling cores connected with a fourth clock pulse source adapted to cause said second, third, fourth and fifth coupling cores to shift to the datum residual state when energized.

5. The circuit as described in claim 4 including means for biasing at least said storage magnetic core toward an opposite residual state.

6. The circuit as described in claim 4 including means for energizing said shift winding means including said first, second, third, and fourth clock pulse source wherein said sources are actuated in sequence in the order named.

7. A magnetic transfer circuit with output branching comprising, a storage magnetic core; control winding means on said storage core; a first, a second, a third, a fourth, and a fifth coupling magnetic core; input and output winding means on each of said coupling cores; circuit means including a resistor serially connecting the output winding means on said first coupling core with the control winding means on said storage core and the input winding means on said second coupling core; further circuit means including an asymmetrical impedance device serially connecting the output winding means on said second coupling core with the input winding means on each of said third, fourth, and fifth coupling cores; a first, a second, a third and a fourth clock pulse source each adapted to deliver a series of pulses in sequence displaced in time; shift winding means on said first coupling core connected with said first clock pulse source so as to cause said first coupling core to shift to a datum residual state when energized; shift winding means on said storage core connected with said second clock pulse source so as to cause said storage core to shift to the datum residual state when energized; shift winding means on said second coupling core series connected with shift winding means on each of said third, fourth, and fifth coupling cores and said fourth clock pulse source so as to cause said second, third, fourth and fifth coupling cores to shift to the datum residual state when energized; means for biasing all said cores toward an opposite residual state; and means for energizing said shift winding means including said first, second, third, and fourth clock pulse source wherein said sources are actuated in sequence in the order named.

8. A magnetic binary logical switching circuit comprising a first, a second, a third, a fourth, and a fifth coupling core, each of said cores capable of attaining bistable states of residual magnetization; input and output winding means on each of said cores; circuit means including an asymmetrical impedance device series connecting the output windings on said first coupling core with the input winding means on each of said second, third and fourth cores; further circuit means including another asymmetrical impedance device connecting the output winding means on said fifth core with the input winding means on said fourth core; shift winding means on said first core and shift winding means on said fifth core adapted to be energized simultaneously and to drive said first and said fifth core to a datum residual state; and shift winding means on each of said first, second, third, fourth and fifth cores adapted to be energized simultaneously and to drive said first, second, third, fourth, and fifth core to the datum residual state.

9. A binary switching circuit comprising a first and a second transfer core; a first and a second number of output coupling cores; input, output and reset winding means on each of said cores; shift winding means on each of said transfer cores; circuit means including an asymmetrical impedance device connecting the output winding means on said first transfer core with the input winding means on each of said first and second number of output coupling cores; further circuit means including another asymmetrical impedance device connecting the output winding means on said second transfer core with the input winding means on said second number of output coupling cores; means including said reset winding means for establishing said cores in a datum residual state; means including the input winding means on each of said transfer cores for selectively reading in information and establishing said transfer cores in an opposite residual state; and means including the shift winding means on each of said transfer cores for shifting said transfer cores to the datum residual state.

10. An information handling circuit comprising, a first and a second transfer coupling core; a first and a second number of output coupling cores; input, output and reset winding means on each of said cores; shift winding means on each of said transfer cores; circuit means including an asymmetrical impedance device serially connecting the output winding means on the first transfer core with the input winding means on said first and second number of output coupling cores; further circuit means including another asymmetrical impedance device serially connecting the output winding means on said second transfer core with the input winding means on said second number of output coupling cores; means including the reset winding means on each of said cores connected with a first clock pulse source adapted to establish each of said cores in a datum residual state; means including the input winding means on each of said transfer cores for selectively reading in information and establishing said transfer cores in an opposite residual state; and means including the shift winding means on each of said transfer cores connected with a second clock pulse source adapted to shift said transfer cores to the datum residual state.

11. The invention of claim 10 including means for biasing all of said cores toward the opposite residual state.

12. The circuit in claim 10 wherein said first number of output coupling cores is two and said second number of output coupling cores is one.

References Cited in the file of this patent

UNITED STATES PATENTS

| | | |
|---|---|---|
| 2,742,632 | Whitley | Apr. 17, 1956 |
| 2,769,925 | Saunders | Nov. 6, 1956 |